United States Patent [19]

Nissels

[11] Patent Number: 4,773,305
[45] Date of Patent: Sep. 27, 1988

[54] PISTON PUMP WITH ROLLING MEMBRANE

[75] Inventor: Robert Nissels, Valliéres, France

[73] Assignee: Berthoud, S.A., Belleville Sur Saone, France

[21] Appl. No.: 64,052

[22] Filed: Jun. 19, 1987

[30] Foreign Application Priority Data

Jun. 26, 1986 [FR] France ............... 86 09484

[51] Int. Cl.⁴ .............................. F01B 19/00
[52] U.S. Cl. ................ 92/98 D; 92/165 PR; 277/177
[58] Field of Search ........... 92/98 D, 6 R, 6 D, 247, 92/165 PR; 91/402, 357; 277/168, 169, 170, 171, 172, 173, 177; 417/571, 437, 539, 439

[56] References Cited

U.S. PATENT DOCUMENTS

| 3,185,041 | 5/1965 | Stein | 92/98 D |
| 3,373,694 | 3/1968 | Taplin | 92/98 D |
| 3,375,759 | 4/1968 | Smith | 92/98 D |
| 3,620,652 | 11/1971 | Jaspers | 92/98 D |
| 3,783,745 | 1/1974 | Meijer | 92/98 D |
| 3,982,471 | 9/1976 | Finger | 277/177 |
| 4,016,960 | 4/1977 | Wilcox | 92/165 PR |
| 4,577,870 | 3/1986 | Scott et al. | 277/177 |

FOREIGN PATENT DOCUMENTS 671194 9/1963 Canada ................... 277/177

Primary Examiner—Robert E. Garrett
Assistant Examiner—Thomas Denion
Attorney, Agent, or Firm—Dowell & Dowell

[57] ABSTRACT

A piston pump having a flexible rolling membrane which seals the piston from the cylinder wherein the piston is designed to include an upper portion which is spaced inwardly from the cylinder wall so as to form a cavity which communicates through channels and seals carried by the lower portion of the piston in such a manner that the lower portion of the flexible membrane is depressed between the upper portion of the piston face and the cylinder walls during an intake stroke as the cavity is subjected to a decreased pressure and which decreased pressure is removed from the membrane during a discharge stroke of the piston. In the preferred embodiment, the membrane is secured to the upper surface of the piston by a cup-shaped element which protects the membrane from materials within the cylinder.

10 Claims, 3 Drawing Sheets

PISTON PUMP WITH ROLLING MEMBRANE

BACKGROUND OF THE INVENTION

1. Field of the Invention

This invention relates to improvements made to piston pumps of which the seal between the piston and the cylinder bore consists of an rolling membrane.

2. Histroy of the Related Art

This membrane type of seals for piston pumps is known to allow for a longer piston stroke and perfect sealing. Unfortunately, it is practically impossible to use such an rolling membrane on sucking and forcing pumps due to the depression resulting from the sucking phase. The piston motion causes partial vacuum inside the cylinder, so that the membrane does not keep flat against the piston periphery, starts folding inside the cylinder and wears out very quickly.

Objects of the Invention

The object of the improvements covered by this invention consists in creating the conditions required for the use of rolling membranes as seals for suction and forcing pumps.

For this purpose and according to the invention, the piston is designed to create a depression behind the membrane during the suction phase, in such a way that the membrane can unroll without parting from the piston skirt. The piston's design also serves to cancel this depression during the forcing phase.

According to a particularly interesting arrangement, the piston skirt of the pump according to the invention presents at the top of the piston a first part the diameter of which is significantly smaller than the cylinder bore, and then a second part of which the diameter is equal to the cylinder bore except for the working clearance between both elements. A peripheral groove is machined in the second part of the piston skirt, close to its junction with the first part, and an axial groove runs from the first groove and ends into the base of the second part. The width of the groove being larger than the diameter of the common type O-ring engaged in the peripheral groove and intended to achieve sealing between the piston and the cylinder during the suction phase, in order to create a depression between the joint area and the membrane, or, on the contrary, in order to release the sealing during the forcing phase.

BRIEF DESCRIPTION OF THE DRAWINGS

The drawings annexed as an example will provide for a better understanding of the invention, of its characteristics and advantages.

DESCRIPTION OF THE PREFERRED EMBODIMENT

Figure 1:
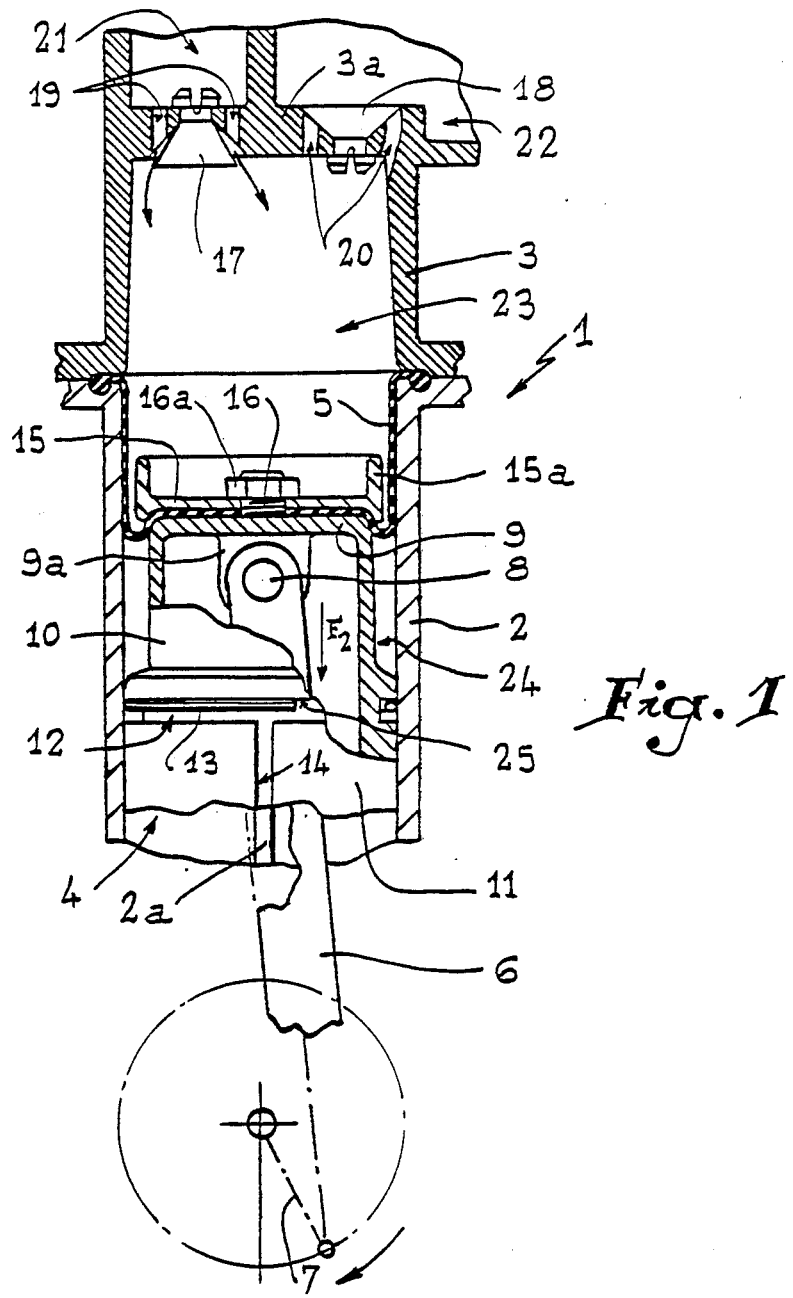
FIG. 1 is a longitudinal cross-section view across a suction and forcing pump according to the invention, the piston of which is shown in a position corresponding to the end of the sucking phase.

The suction and forcing or discharge pump according to the invention represented on the drawings consists mainly of a cylinder 1 made of a lower part 2 and of an upper part 3, of a piston 4 and of an rolling membrane 5 of which the upper part of the side wall is clamped between the parts 2 and 3 of the cylinder 1, while the bottom thereof works in association with the top of piston 4.

Of course the piston moves reciprocatingly inside the cylinder bore 1 and is driven by means of a connecting rod 6 attached to the crank pin 7 of a crankshaft, the circular movement of said crank pin being represented by a dot and dash line. The upper end of the connecting rod is articulated onto piston 4 by means of a pin 8 engaged in a fork joint 9a protruding out of the internal face of the top part 9 of the piston.

The skirt of the piston 4 comprises a first part 10 of which the diameter is significantly smaller than the cylinder bore, and a second part 11 located under the first one and having a diameter approximately equal to that of said cylinder bore, except for the working clearance between both elements.

The lower part 11 of the skirt of piston 4 is provided, close to its junction with the upper part 10, with a peripheral groove 12 whose width and depth are larger than the common type O-ring 13 engaged in the groove. This results in some side and axial clearance between the ring seal and the groove's walls. A longitudinal groove 14 extends from the groove 12 and provides for communication between the lower part of the piston skirt and said peripheral groove.

As can be seen, the bottom of membrane 5 is associated with the top 9 of piston 4 by means of a cup 15 attached to the piston top by a threaded pin and nut device 16-16a. By this arrangement, the bottom of the membrane is clamped between said cup and the top 9 of piston 4. The cup's base protrudes beyond the external face of piston 4 so as to orient the junction area between the piston side wall and the membrane bottom slightly towards the bottom of the space included between the upper part 10 of the piston and the bore of cylinder 1. The cup 15 is provided with a peripheral wall 15a which extends above the cup's base and whose peripheral face is in form of a truncated cone opening downwards.

The bore of the lower part 2 of cylinder 1 is cylindrical, while that of the upper part 3 is slightly tapered and opening downwards in the same way as the peripheral face of the wall 15a of cup 15, with substantially the same conicity.

It can be seen that the upper part 3 of cylinder 1 is closed by a cross partition 3a, which is equipped with two valves 17, 18 intended to obturate the ports 19, 20 respectively. The valve 17 and the ports 19 communicate with the chamber 21 into which the liquid is aspirated, while the valve 18 and the ports 20 are associated with the discharge chamber 22.

In a preferred form, the bore of the lower part 2 of the cylinder can be fitted with two ribs 2a engaging into the grooves 14. This co-operation makes it possible on the one hand to guide the piston properly with respect to the cylinder, in order to prevent the membrane from twisting, and on the other hand to clean the grooves and to ensure free and steady passage of air.

Figure 2:
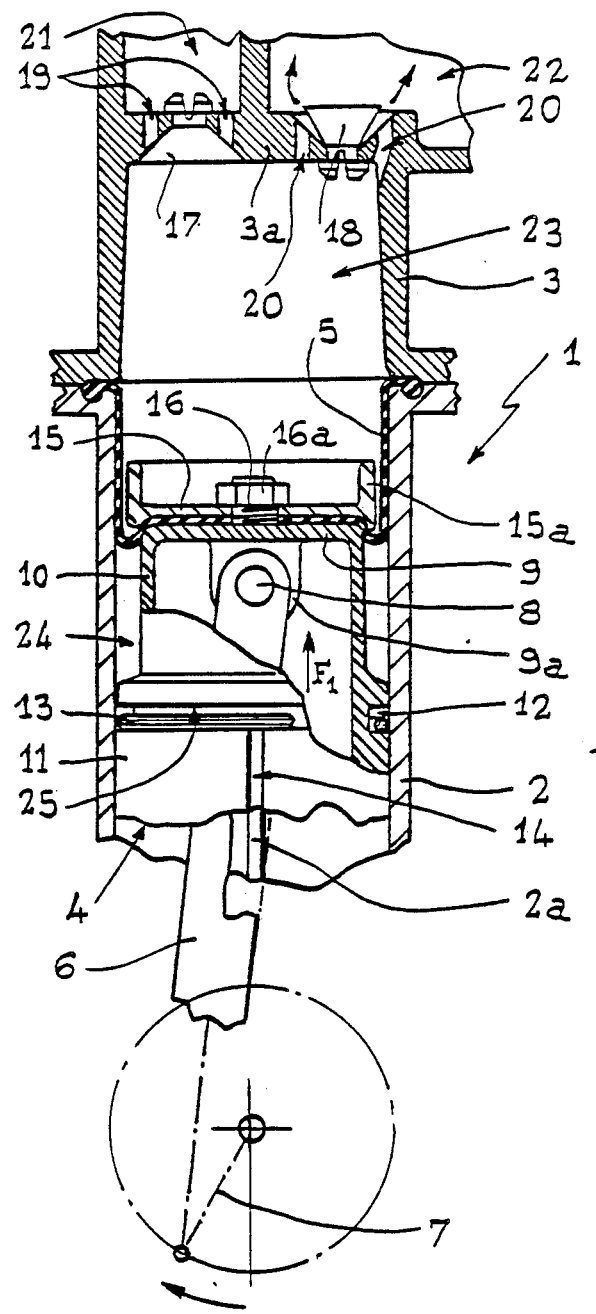
FIG. 2 is a view similar to FIG. 1 but showing the piston at the beginning of the forcing or discharge phase.
Figure 3:
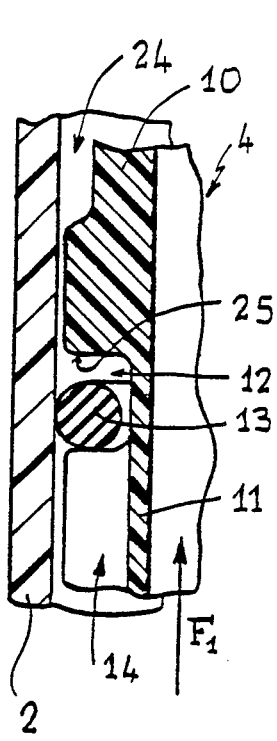
FIGS. 3 to 5 illustrate the different positions of the piston ring seal with respect to its mounting groove.

The pump operates as follows:

In the discharge phase (see FIG. 2), the piston 4 moves upwards in the direction of the F1 arrows. The pressure inside the chamber 23 as defined between the piston and the bore of cylinder 1 pushes the side wall of membrane 5 both against the bore and against the peripheral face of part 10 of piston 4. The valve 17 is then closed, of course, while valve 18 is open in order to let the previously aspirated liquid flow out towards chamber 22 through the ports 20. During the upward movement of the piston, the O-ring 13 is pushed against the lower face of the groove 12 (FIG. 3) as a result of its friction contact with the lower part 2 of cylinder 1. This lower part communicates through the groove 14 with the space 24 as defined respectively by the bore of the part 2 of the cylinder 1, the peripheral face of the part 10 of the piston 4, the shoulder 25 formed by the parts 10 and 11 of the piston and the membrane 5. So, when the piston moves upwards, said space 24 lies under atmospheric pressure.

When the piston reaches its top dead center, the side face of the wall 15a of the cup 15 comes in contact with the top end of the tapered bore of the upper part 3 of cylinder 1, so that, when the pump is at rest in that position of the piston, the membrane is fully protected from the liquid contained in the discharge chamber 22 or in the aspiration chamber 21. In particular, the particles in suspension concentrate by decantation in the hollow part of the cup 15 as defined by its partition 15a.

Figure 4:
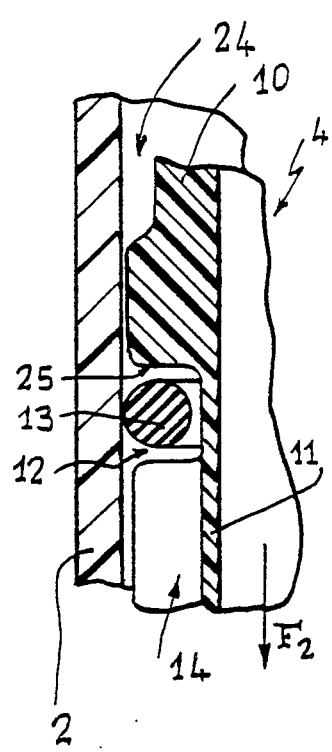
Figure 5:
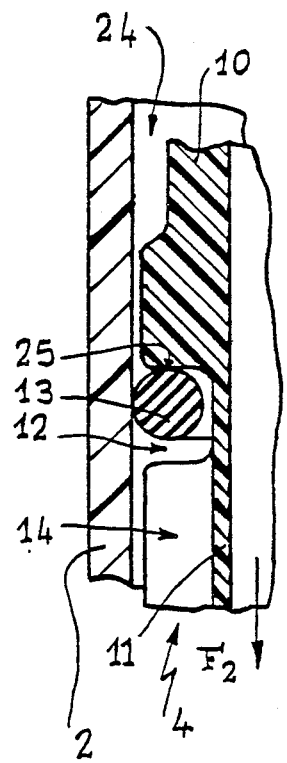

When the linear displacement of the piston 4 reverses, i.e. when the piston passes over its top dead center, the valve 18 closes and the valve 17 opens, which starts the aspiration stroke. The downward movement of the piston causes its groove 12 to slide with respect to the seal 13, which remains stationery (see FIG. 4), so that it interacts with the lower face of shoulder 25 (FIG. 5). It is easy to understand that a partial vacuum is created inside the space 24 as the piston moves further down, so that the membrane is aspirated into this space without possibility of folding on the top of the piston.

In this way, the membrane unrolls properly until the piston 4 reaches its bottom dead center. The seal 13 remains in the same position (FIG. 5). As soon as the piston passes over its bottom dead center, the pump reverts to the position of FIG. 3 after the groove 12 has changed its position with respect to the seal 13, which remains stationery (FIG. 4), in order to bring the space 24 back under atmospheric pressure and to provide for a proper rolling of the membrane without any risk of damage to same.

At last, it should be noted that the displacement of the piston 4 between its bottom and top dead centers is such that its lower part 11 interacts only with the cylindrical bore of the lower part 2 of cylinder 1.

If the pump remains at rest with the piston at bottom dead center (FIG. 1), the major part of the particles in suspension in the aspiration and/or discharge chamber(s) and in the space 23 are collected into the cup 15, where they don't endanger the membrane 5.

It is to be understood that the foregoing description is given only as an example and that it doesn't restrict in any way the scope of the invention, which would still apply in case realization details were to be modified or replaced by any other equivalent ones.

What is claimed is:

1. A suction and forcing piston pump having a cylinder in which a piston is moved in a reciprocating manner by a piston rod having an intake stroke and a discharge stroke, a flexible membrane for sealing the space between the top of the piston and the inlet and discharge ports of the pump and having end portions retained in sealed engagement with the wall of the cylinder and a central portion secured to the piston, the improvement comprising, said piston having upper and lower parts and a lower end, said upper part having an outer wall defining a first diameter which is less than the diameter of the cylinder so as to create a cavity therebetween, said lower part having an outer wall defining a second diameter which is greater than said first diameter and slightly less than the diameter of the cylinder, vent means for selectively providing a fluid opening into said cavity between said cylinder and said upper part of said piston so that said cavity is in open communication with the pressure in an area remote from said lower part of said piston, seal means for closing said vent means so as to close the fluid opening into said cavity between said cylinder and said upper part of said piston, said seal means closing said vent means when said piston is moved during the intake stroke thereby creating a reduction in pressure within said cavity between said cylinder and said upper part of said piston which reduced pressure causes said flexible membrane to be drawn partially into said space and against outer wall of said lower part of said piston and the adjacent cylinder wall, and said seal means being operative to open said vent means so as to provide for an increase in pressure within said cavity when said piston means is moved to initiate a discharge stroke.

2. The suction and forcing piston pump of claim 1 in which said vent means includes a peripheral groove formed in said outer wall of said lower part of said piston and at least one longitudinal groove opening into and extending from said peripheral groove to said lower end of the second part of said piston, and said peripheral groove having upper and lower edges which define a first width.

3. The suction and forcing piston pump of claim 2 in which said seal means includes an annular seal seated within said peripheral groove, said annular seal having a cross-sectional dimension less than the width of said peripheral groove, said annular seal being engageable between the cylinder wall and said upper edge of said peripheral groove during the intake stroke of the piston and being engageable between the cylinder wall and said lower edge of the peripheral groove when the piston is moved during the discharge stroke, and said annular seal being positioned intermediate said upper and lower edges of said peripheral groove when the piston is adjacent both the top dead center and botoom dead center positions of the piston relative to the cylinder.

4. The suction and forcing piston pump of claim 3 in which said annular seal is a O-ring having a diameter which is less than said width of said peripheral groove.

5. The suction and forcing piston pump of claim 4 in which the central portion of the flexible membrane is secured to the top of the piston by a cup-shaped element having an annular side wall oriented upwardly and inwardly toward the inlet and discharge ports of the pump, said cylinder having upper and lower sections having inner walls, said annular wall of said cup-shaped element being positioned inwardly of said inner wall of said lower section of the cylinder.

6. The suction and forcing piston pump of claim 5 in which said upper section of the cylinder includes an inwardly tapering wall portion adjacent the inlet and discharge ports, said annular wall of said cup-shaped element being cooperatively seated with said inwardly tapering wall when the piston is in a top dead center position with respect to the cylinder.

7. The suction and forcing piston pump of claim 6 in which said lower part of the piston remains within said lower section of the cylinder during the inlet and discharge strokes of the piston.

8. The suction and forcing piston pump of claim 6 in which said lower section of the cylinder is provided with at least one longitudinal rib that extends inwardly thereof, said longitudinal rib being receivable within said longitudinal groove within said lower part of the piston.

9. The suction and forcing piston pump of claim 1 in which the central portion of the flexible membrane is secured to the top of the piston by a cup-shaped element having an annular side wall, said annular wall of said cup-shaped element being tapered inwardly as it extends upwardly toward the inlet and discharge ports of the pump, the cylinder being formed of upper and lower sections, said outer end of the flexible membrane being seated between said upper and lower cylinder sections, said upper cylinder section having an inwardly tapering side wall adjacent said inlet and discharge ports, said annular side wall of said cup-shaped element being cooperatively engageable with said inwardly tapering side wall of said upper section of said cylinder when said piston is in a top dead center position whereby the cup-shaped element will seal the flexible membrane from the inlet and discharge ports.

10. The suction and forcing piston pump of claim 3 in which the cylinder is provided with at least one longitudinal rib that extends inwardly thereof, said longitudinal rib being receivable within said longitudinal groove in said piston.

* * * * *